United States Patent [19]

Lagarrigue

[11] Patent Number: 5,069,861
[45] Date of Patent: Dec. 3, 1991

[54] APPARATUS FOR THE REMOTE UNSCREWING AND EXTRACTION OF AN ASSEMBLY SCREW

[75] Inventor: Francis Lagarrigue, Sainte-Foy-les-Lyon, France

[73] Assignees: Frametome, Courbevoie; Cogema, Velizy Villacoublay, both of France

[21] Appl. No.: 436,984

[22] Filed: Nov. 15, 1989

[30] Foreign Application Priority Data

Nov. 16, 1988 [FR] France ................. 88 14890

[51] Int. Cl.[5] ............................................. G21C 19/32
[52] U.S. Cl. ...................................... 376/260; 29/257; 81/13; 269/249
[58] Field of Search .................. 376/260, 261, 446; 29/257, 723, 906; 81/13; 269/249

[56] References Cited

U.S. PATENT DOCUMENTS

| | | | |
|---|---|---|---|
| 1,380,071 | 5/1921 | Marzyck | 81/13 |
| 1,412,961 | 4/1922 | Periolat | 269/249 |
| 1,639,111 | 8/1927 | Rotsch | 29/257 |
| 1,918,944 | 7/1933 | Wells | 81/451 |
| 2,535,638 | 12/1950 | Jones | 81/13 |
| 3,997,152 | 12/1976 | Sass et al. | 269/249 |
| 4,690,593 | 9/1987 | Nee et al. | 376/260 |
| 4,729,158 | 3/1988 | Williams | 29/467 |

FOREIGN PATENT DOCUMENTS 3622199 1/1988 Federal Republic of Germany .

Primary Examiner—Daniel D. Wasil
Attorney, Agent, or Firm—Pollock, Vande Sande & Priddy

[57] ABSTRACT

The apparatus comprises a pole (32), a C-shaped frame (34) fastened to one end of the pole (32) and having two branches (35, 36) substantially parallel to one another and an adjoining part (37) between the two branches, an extraction screw (40) engaged in an internally threaded hole passing through one branch (35) of the frame (34) and having one end forming a punch (50) directed towards lthe inside of the frame (34), and a means (43) for the remote actuation of the extraction screw (40) by screwing or unscrewing. The apparatus also possesses a centring ring (47) arranged round a smooth part of the extraction screw located between its threaded part and its end (50) forming the punch. Unscrewing is carried out by exerting a torque about the axis of the screw (16a) to be extracted, by means of the pole (32) and the frame (34), after the extraction screw has been tightened. The apparatus can be used particularly for carrying out the unscrewing and extraction of screws for the fastening of springs (27) of the fuel assembly of a nuclear reactor.

8 Claims, 4 Drawing Sheets

APPARATUS FOR THE REMOTE UNSCREWING AND EXTRACTION OF AN ASSEMBLY SCREW

This invention relates to an apparatus and a process for the remote unscrewing and extraction of an assembly screw, the head of which is damaged, particularly of a screw of which the head is separated from the threaded body by breakage.

The fuel assemblies of nuclear reactors cooled with light water and, in particular, the fuel assemblies of pressurized-water nuclear reactors comprise a bundle of parallel fuel rods arranged in a framework having end connectors. The fuel assemblies, in the operating position and during their deactivation storage, are placed in a position in which the fuel rods are arranged vertically, the fuel assemblies resting on a support by means of their lower connector.

The upper connector has leaf springs, on which the upper plate of the reactor core comes to rest when the assemblies are in operation in the vessel of the nuclear reactor.

The leaf springs are fastened to the upper connector by means of flanges which are screwed to a frame forming the upper part of the connector.

The flanges are brought to bear on the end part of the springs and have countersinks, into which it is possible to introduce the assembly screws passing through the end parts of the springs and possessing a threaded part screwed into an internally threaded hole passing through the frame of the connector. When the assembly screws have been tightened, the heads of these screws are seated completely in the countersinks above the springs, and their end part opposite the head projects slightly relative to the lower surface of the connector frame.

The springs of the upper connector of the fuel assemblies ensure that these assemblies are retained in the operating reactor as a result of the bearing force of the upper core plate transmitted to their framework by means of the springs.

In the operating reactor, the springs, called anti-flyoff springs, can experience some damage, with the result that they no longer satisfactorily perform their function of retaining the fuel assembly. In particular, the springs can suffer breaks or lose their elasticity characteristic under irradiation.

It is then necessary to replace the damaged spring leaves and, for that purpose, remove the flange of the upper connector of the assembly. This operation is carried out remotely, the assembly being in the storage position in the bottom of a pool, by using a tool of conventional type having a hexagonal socket interacting with the head of the fastening screw of the spring. The hexagonal socket of the tool is fastened to the end of a pole actuated by operators working from the operating platform of the pool. After a certain operating time of the fuel assembly, the fastening screws of the springs are corroded and the threaded shank of the screw can be jammed in the thread of the socket. Furthermore, the screws have detent pins ensuring that they are blocked in terms of rotation.

In order to extract a screw, it is necessary beforehand to machine the detent pin of the screw with a bell-type cutter and then unscrew it by means of a tool which ensures that the screw is gripped at the end of the removal operation. The screw is injected into a discharge container held underwater in the fuel-assembly storage pool.

This procedure therefore makes it necessary to employ suitable cutting and unscrewing tools of complex structure and use.

Likewise, to ensure the installation, tightening and locking of the new fastening screw of the flange and springs, suitable tools have to be used.

Moreover, it may be necessary to exert a considerable tightening torque on the tool, with the result that the screw head is liable to break in a zone forming an incipient breaking point at the intersection of the head and the shank of the screw, part of which is threaded.

Studies have been conducted to prevent, as far as possible, the screws from breaking and in particular it has been proposed to use nickel alloys resistant to corrosion and to the effects of irradiation in order to produce these screws. The replacement of the screws of older type by screws of the more recent nickel-alloy type can be carried out during the shutdowns of the reactor for the refueling of the core.

If the head of a screw has undergone a break or damage making it impossible to exert the unscrewing torque on the screw head, the customary procedure for removing and extracting the screw is no longer practicable.

On the other hand, there are known devices for the unscrewing and extraction of screws with a damaged head, which comprise a C-shaped frame and an extraction screw terminating in a punch and engaged in an internally threaded hole passing through one branch of the frame. A bearing piece is fastened to the frame branch opposite the branch in which the extraction screw is engaged. However, such apparatus as described in U.S. Pat. Nos. 1,380,071, 2,535,638 and 1,639,111 are not suitable to be put in place and actuated remotely, for example in order to carry out the unscrewing and extraction of a fastening screw of an element of a fuel assembly of a nuclear reactor from the platform of the fuel storage pool of the reactor.

The object of the invention is, therefore, to provide an apparatus for the remote unscrewing and extraction of a fastening screw of an element of a fuel assembly of a nuclear reactor, the head of which is damaged, the screw being engaged by means of its head part in a bore of a first piece of the assembly and by means of its threaded body in an internally threaded bore passing through a second piece, this apparatus comprising a C-shaped frame having two branches substantially parallel to one another and adjoining part between the two branches, and an extraction screw engaged in an internally threaded hole passing through one branch of the frame and having one end forming a punch directed towards the inside of the frame, and a bearing and centring piece, the diameter of which is smaller than the diameter of the internally threaded bore of the second piece and which is fastened to the second branch of the frame and is directed towards the inside of the frame in the axial direction of the extraction screw, this apparatus being usable whatever the state of the screw head, and, in particular, when this screw head is separated from the body completely by breakage.

To achieve this, the apparatus according to the invention also possesses:

a pole of great length, to the end of which the C-shaped frame is fastened, a ring for centring the extraction screw relative to the screw to be extracted, arranged round the extraction screw over a smooth part of this screw located between its threaded part and its end part forming the punch, and a means for the remote actuation of the extraction screw by screwing or unscrewing.

In a preferred embodiment, the apparatus furthermore possesses a bearing and centring piece, the diameter of which is smaller than the diameter of the threaded bore of the second piece and which is fastened to the second branch of the frame and is directed inwards in the axial direction of the extraction screw.

To make it easy to understand the invention, several embodiments of an apparatus according to the invention and its use for carrying out the unscrewing and extraction of a fastening screw of an anti-flyoff spring in the upper connector of a fuel assembly of a pressurized-water nuclear reactor will now be described by way of non-limiting example, with reference to the accompanying figures.

Figure 1:
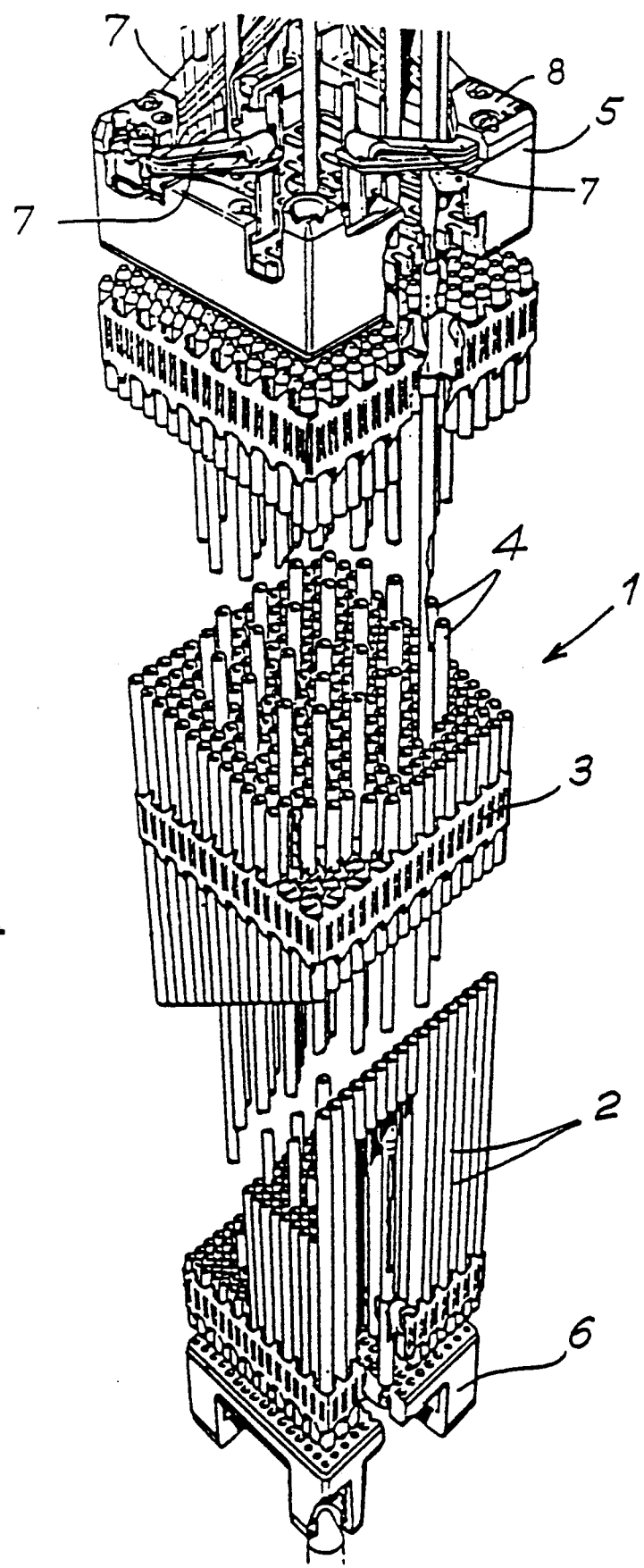
FIG. 1 is a perspective view of a fuel assembly of a pressurized-water nuclear reactor.

FIG. 1 shows a fuel assembly of a pressurized-water nuclear reactor, designated as whole by the reference 1. This fuel assembly comprises fuel rods 2 forming a bundle, in which the rods are placed in a parallel arrangement and are held by a framework consisting of spacer plates 3 distributed over the length of the rods, guide tubes 4, an upper connector 5 and a lower connector 6. The spacer plates hold the rods according to a network with meshes which are square in the transverse planes of the bundle. Some positions of the network of spacer plates 3 are reserved for the guide tubes 4 which are fastened at their ends to the connectors 5 and 6 and, in zones distributed over their length, to the spacer plates 3.

The upper connector 5 has spring leaves 7 fastened to the connector 5 by means of flanges 8.

The spring leaves 7 ensure that the fuel assembly 1 is detained in the reactor core, the fuel assembly resting on the lower core plate by means of its lower connector 6, and an upper core plate coming to bear on the springs 7 in order to retain the assembly against the forces exerted by the cooling fluid of the reactor circulating vertically in contact with the rods 2.

Figure 2:
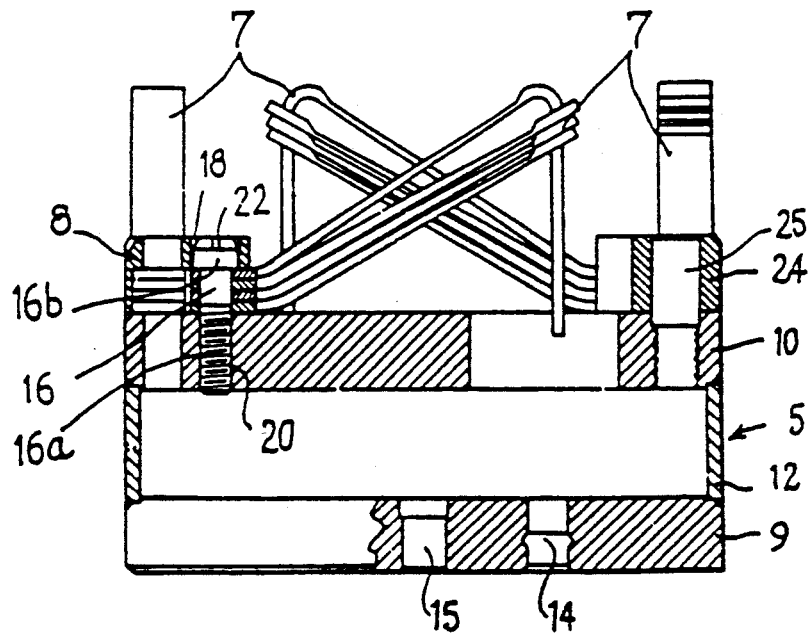
FIG. 2 is a partially sectional elevation view of the upper connector of the fuel assembly shown in FIG. 1.
Figure 3:
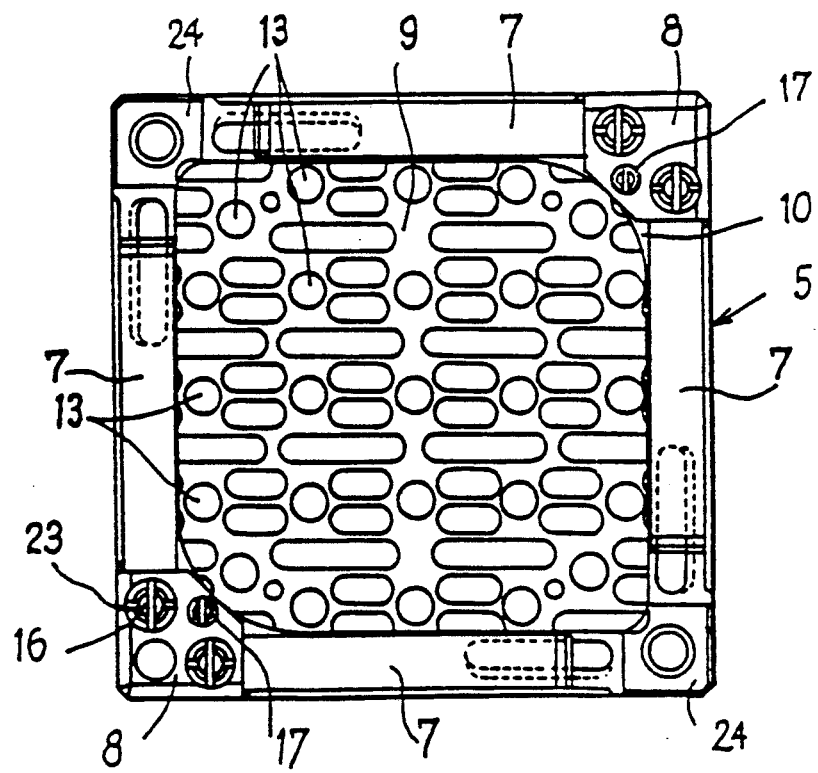
FIG. 3 is a top view of the upper connector as shown in FIG. 2.

FIGS. 2 and 3 show the upper connector 5 of the assembly 1, comprising an adaptor plate 9 and a frame 10 which are connected by means of a skirt 12 of square cross-section fastened by welding to the periphery of the adaptor plate 9 and to the periphery of the frame 10.

The adaptor plate 9 has passing through it the fastening holes 14 of the guide tubes 4 and holes 13 allowing the passage of the cooling water of the reactor which has flowed through the assembly.

The fastening hole 15 of the instrumentation tube of the assembly, located in the central part of the adaptor plate 9, has a different form from the fastening holes 14 of the guide tubes 4.

The springs 7 consist of leaves retained on the connector by the flanges 8 and by fastening screws 16. Each of the flanges 8 ensures the retention of two sets of spring leaves 7 arranged at 90° relative to one another along two sides of the frame 10 of the connector.

The leaves of the springs 7 are engaged under the flanges 8 by means of an end part, the various leaves stacked under the flange possessing mutually coinciding orifices allowing the passage of the fastening screw 16.

Each of the flanges 8 is likewise retained on the frame 10 of the upper connector 5 of the assembly by means of a fastening screw 17. The leaves of the springs 7 are thus retained both by the flanges 8 and by the fastening screws 16.

The fastening screws 16 are each engaged in a countersink 18 passing through the upper bearing part of the flange 8.

The screws 16 comprise a threaded part 16a engaged in an internally threaded hole 20 passing through the adaptor plate 10, and a head 16b engaged in the countersink 18 of the flange 8 and coming to bear on the leaves of the springs 7 engaged under the flange 8. The head 16b of the hexagon-socket type has an inner bore of hexagonal cross-section for the engagement of a screwing and unscrewing tool. Each of the screws 16 is locked in terms of rotation in the corresponding countersink 18 by means of a key 22 force-fitted into a slot 23 machined in the screwhead 16b.

The keys 22, which experience bending when they are being force-fitted into the slot 23 of the screwhead and into the countersink 18, ensure a retention of the screw 16 which is no longer liable to come loose and separate from the connector 5, even in the event of a breakage of the screwhead 16b causing it to be separated from its threaded part 16a.

The upper connector of the assembly also possesses welded bosses 24, through which pass bores 25 intended for receiving the fingers of a grab for handling the fuel assembly.

Figure 4:
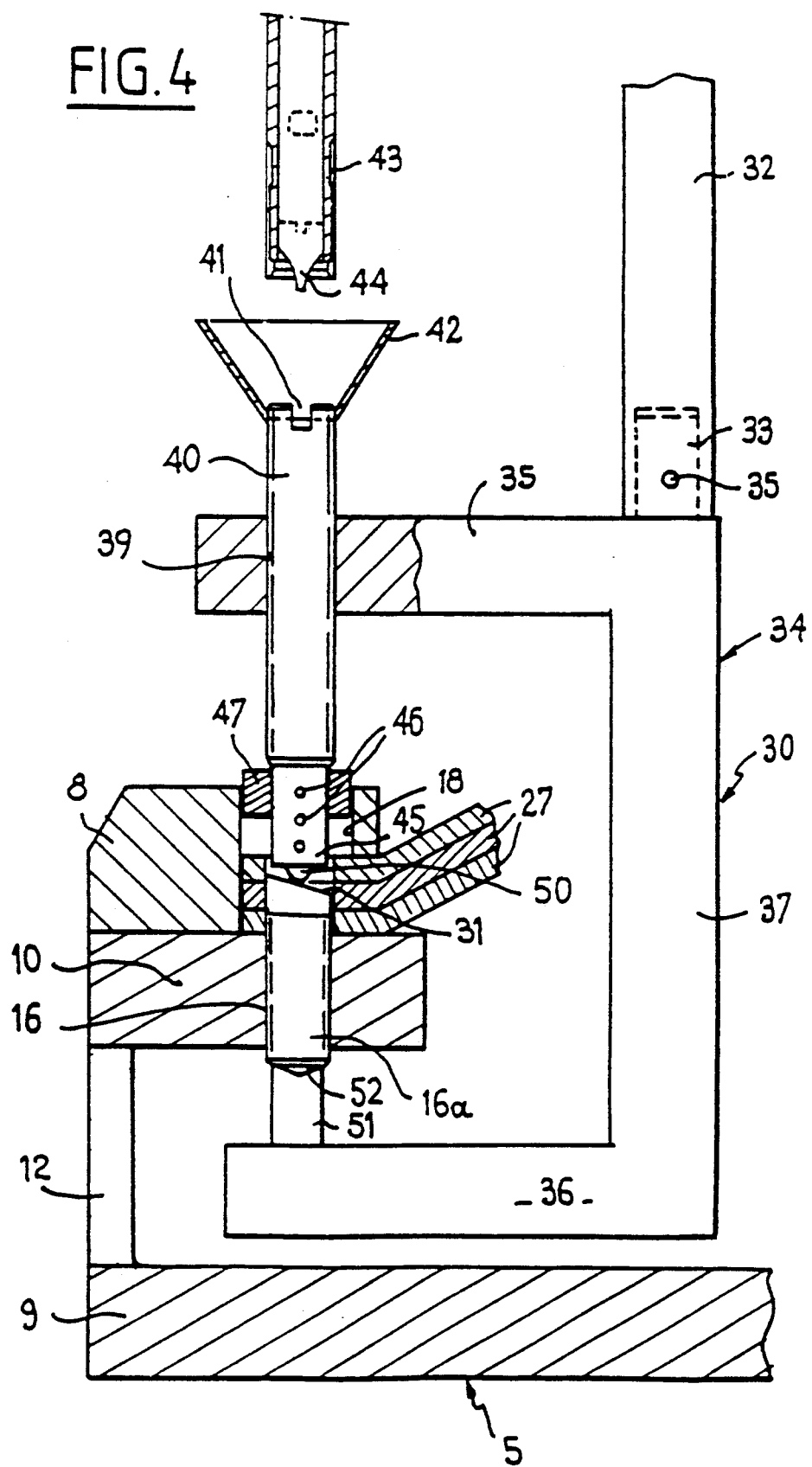
FIG. 4 is a partially sectional elevation view of an unscrewing and extracting apparatus according to the invention in the operating position on the upper connector of a fuel assembly.

FIG. 4 shows part of the upper connector 5 of a fuel assembly during an operation to unscrew and extract a screw 16 for fastening spring leaves 27 engaged, at one of their ends, under a flange 8 fastened to the frame 10 of the connector 5.

This operation is carried out by means of an apparatus according to the invention designated as a whole by the reference 30. This operation is conducted under a depth of water sufficient to ensure the biological protection of the operators, inside a fuelassembly deactivation pool.

To carry out the replacement of a spring leaf 27 of the fuel assembly, there has previously been an attempt to unscrew the screw 16 by means of the abovedescribed process according to the prior art.

During this unscrewing, the screw 16, the threaded part 16a of which was jammed inside the internally threaded hole of the frame 10, experienced a break along a surface of inclined cross-section 31, so that the head of the screw was separated from the threaded part 16a which remained engaged in the frame 10.

The unscrewing and extraction of the screw 16 can therefore no longer be carried out by means of the process according to the prior art.

The apparatus 30 according to the invention, illustrated in FIG. 4, makes it possible to carry out the unscrewing and extraction of the screw 16 which has undergone a break of its head part 16b.

The apparatus 30 has a pole 32 of great length, for example four meters, the lower part of which is shown in FIG. 4. Such a pole, allowing a repair tool to be supported and suspended in the deactivation pool of a nuclear reactor, can be manipulated by operators from the upper platform of the pool.

The pole 32, in its lower part, has an orifice 33 of square cross-section, into which engages a part of corresponding form of the frame 34 of the unscrewing and extraction apparatus 30. The fastening and locking of the frame 34 on the end of the pole 32 are obtained by means of a pin 35 engaged in mutually coinciding holes of the pole and of the fastening part of the frame 34.

The C-shaped frame 34 comprises two parallel branches 35 and 36 and adjoining part 37 between these two branches. The joining part 37 is fastened in the extension of the pole 32 and is in a substantially vertical position when the tool is in operation, as shown in FIG. 4, on the upper connector 5 of the fuel assembly. The branches 35 and 36 are then substantially horizontal. The upper branch 35 of the frame has passing through it an internally threaded hole 39, the direction of which corresponds to the direction of the axis of the joining part 37 and of the pole 32. An extraction screw 40 is engaged in the internally threaded hole 39 by means of its threaded middle part. The extraction screw 40 has a slot 41 in its upper part, which is extended by a widened insertion part 42 for the end part 43 of a screw driver, the blade 44 of which is intended for engaging in the slot 41 in order to carry out the screwing or unscrewing of the extraction screw 40.

The end part 43 of the screw driver is fastened to the end of an actuating rod which can be manoeuvred from the upper platform of the pool.

The screw 40 has an end part which is located underneath its threaded middle part and opposite the slot 41 and which consists of a calibrated cylindrical endpiece 35 pierced with radially directed orifices 46. A ring 47 is engaged on the endpiece 45 and is retained in a specific axial position by a pin engaged in a hole 46 and in a corresponding orifice of the ring 47.

The outside diameter of the ring 47 corresponds to the inside diameter of the countersink 18, the ring 47 ensuring the centring and positioning of the actuating screw 40 in the countersink 18 of the collar 8 for the purposes of extracting the screw 16.

The endpiece 45 of the screw 40 carries, at its end, a punch 50 of great hardness and of conical form, capable of penetrating into the metal of the screw 16 in the region of the breaking surface 31.

The lower branch 36 of the frame 34 carries a bearing and centring piece 51 directed towards the inside of the frame in the axial extension of the internally threaded hole 39 and of the screw 40 and having a concave bearing surface 52 at its end.

As can be seen in FIG. 4, the frame 34 has dimensions allowing it to be engaged inside the frame 10 of the upper connector 5 of a fuel assembly, in such a way that the parallel branches 35 and 36 are located on either side of a flange 8 and the frame 10 of the connector 5.

Figure 5:
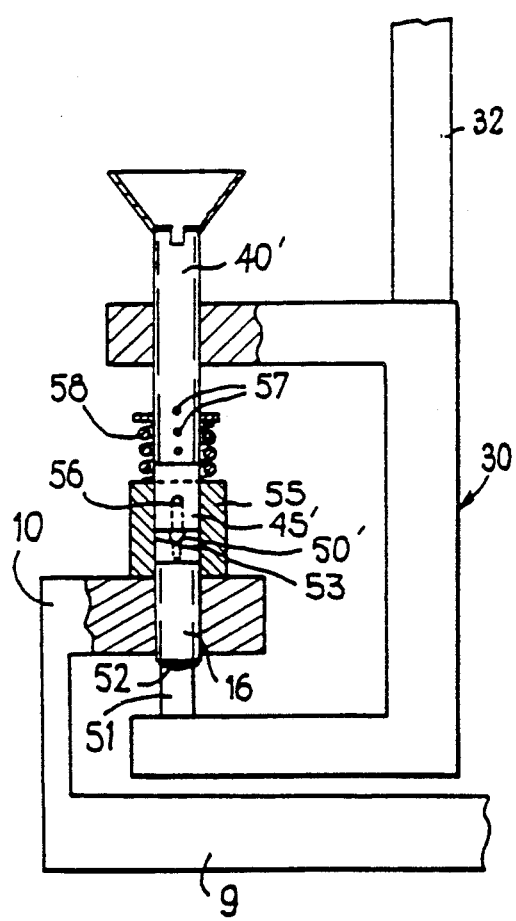
FIGS. 5 and 6 are views, similar to that of FIG. 4, of two alternative embodiments of the apparatus according to the invention.
Figure 6:
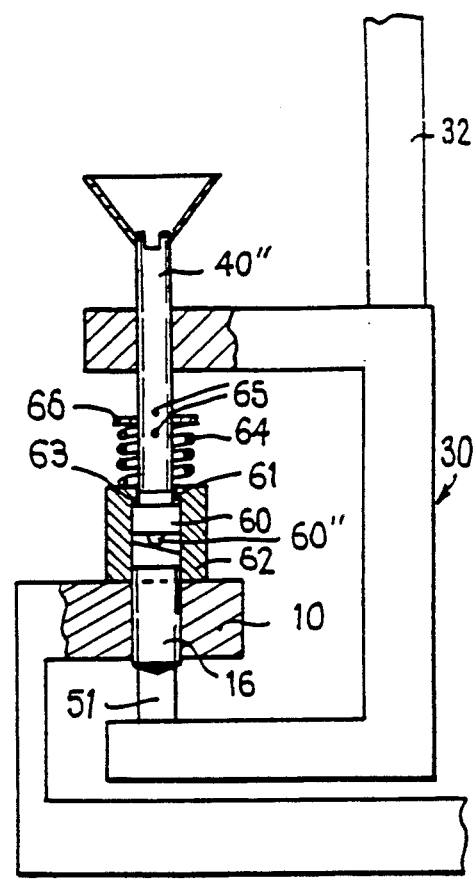

FIGS. 5 and 6 illustrate two alternative embodiments of an apparatus according to the invention, the corresponding elements in FIG. 4 on the one hand and in FIGS. 5 and 6 on the other hand bearing the same references.

The apparatuses illustrated in FIGS. 5 and 6 are intended for extracting fastening screws of springs of upper fuel-assembly connectors, such as the screw 16, the head of which has experienced a break. These apparatuses can be used after the removal of the flange 8 and of the springs, the upper part of the screw having the breaking surface 53 projecting relative to the upper surface of the frame 10 of the upper connector 5.

The extraction screw 40' has an end part 45' located below its threaded part and terminating in a punch 50' capable of penetrating into the head of the screw 16.

A tubular piece 55 is arranged round the part 45' of the screw and is fastened to this part of the screw by means of a key 56 engaged in mutually coinciding radially directed holes of the tubular piece 55 and of the screw 40'.

A helical spring 58 is arranged round the threaded part of the screw 40' above the tubular piece 55. The screw 40', in its threaded part, has a set of holes 57 capable of receiving a pin bearing on a washer ensuring the adjustment of the compression of the spring 58.

The spring 58 ensures that the tubular piece 55 is brought to bear on and retained against the upper face of the frame 10 of the connector 5 round the projecting part of the screw 16.

The tubular piece 55 forming a ring for centring the extraction screw 40' accompanies this screw in its rotational movement during the screwing or unscrewing. However, the limited force exerted by the spring 58 makes it possible to avoid impeding the functioning of the apparatus.

FIG. 6 shows an alternative embodiment of the apparatus according to the invention, of which the extraction screw 40" has a diametrically widened end part 60 possessing an upper shoulder 61 below its threaded part. The tubular piece 62 forming a centring ring is slipped onto the end part of the screw 40" and comes to rest on the shoulder 61 by means of a shoulder 63 provided on its inner bore.

A spring 64 arranged round the threaded part of the shank 40" bears on the upper face of the centring ring 62 and is put under compression by means of a washer 66 and a pin engaged in a radially machined hole 65 of the screw 40". The compression of the spring exerting a push on the centring ring 62 can thereby be adjusted.

During the putting in position of the apparatus, as shown in FIG. 6, the centring ring 62 takes its place round the projecting part of the screw 16 above the frame 10 of the connector and is retained by the spring 64. On the other hand, the diametrically widened part 60 of the screw 40", engaged virtually without play in the bore of the centring ring 62, ensures a centring and positioning of the extraction screw 40" relative to the screw 16 to be extracted.

Reference will now be made to the figures taken as a whole in order to describe the functioning of the apparatus according to the invention.

The fuel assembly 1, in the storage position at the bottom of the deactivation pool of a nuclear reactor, is placed in a handling device, called a downward conveyor, fastened to one wall of the pool. The fuel assembly 1 has a fastening screw for a set of spring leaves 7, the head 16b of which has been separated from the threaded body 16a in the region of a breaking surface, such as the surface 31 shown in FIG. 4.

The body 16a of the screw projects over an approximate length of 9 mm relative to the lower surface of the frame 10 of the connector. The breaking surface 31 of the screw head is at a depth of approximately 21 mm within the countersink 18 of the flange 8.

A receptacle for waste and foreign bodies is arranged underwater in the connector below the screw 16 to be extracted.

In a first stage, a recentring of the spring leaves 27 is carried out (FIG. 4) by using a tool mounted on the end of a pole actuable from the platform of the pool. This tool is engaged over a height of 3 mm inside the countersink 18 and has a conical stud ensuring the recentring of the three spring leaves 27.

As shown in FIG. 4, the tool according to the invention is then lowered by means of the pole 32 into the region of the upper connector 5 of the assembly 1. The frame 34 of the tool is placed relative to the frame 10 of the connector and relative to the flange 8 in its position shown in FIG. 4.

The tool 30 does not have the bearing piece 51 which can be mounted removably on the lower branch 36 of the frame 34.

The end of the extraction screw 40 having the centring ring 47 is introduced into the countersink 18 of the flange 8 over a height of approximately 6 mm. During this operation, the pole 32 is maintained in a perfectly vertical position.

The screwing of the extraction screw 40 is carried out by means of the screwdriver 43, until the punch 50 of the screw 40 penetrates into the metal of the screw 16 in the region of the breaking surface 31. For this purpose, a tightening torque of approximately 1 m—10 N is exerted. The centring of the extraction screw 40 is obtained by means of the ring 47 engaged in the countersink 18 of the flange 8. The projecting lower part of the screw 16 bears on the lower branch 36 of the frame 34.

The apparatus according to the invention acts in the manner of a clamp and ensures the axial clamping of the part 16a of the screw 16. The tool is arranged so as to be capable of exerting a torque on the entire frame 34 about the axis of the extraction screw 40. The arrangement of the frame 34 allows a movement permitting a rotation of approximately 60° of the unit consisting of the frame 34, of the extraction screw 40 and of the part 16a of the screw to be extracted, before the tool comes up against the frame 10 of the upper connector of the assembly.

The release and the commencement of loosening of the screw 16a are obtained in this way. The torque exerted from the operating handle of the pole 32 located in the region of the platform for the pool can be considerable, the branches 35 and 36 of the frame 34 having some length.

The unscrewing of the extraction screw 40 is then obtained by means of the screwdriver 43, and the frame 34 is then returned to its initial position. As before, the extraction screw 40 is tightened until the punch 50 penetrates into the metal of the screw 16. An additional unscrewing is then carried out, until the tool comes against the frame of the connector of the assembly.

Several successive operations, such as that described above, are conducted, up to the moment when the centring ring 47 is completely free of the countersink 18 of the flange 8, this corresponding to an unscrewing of the screw 16 of 6 mm.

The lower arm 36 of the frame 34 is then virtually in contact with the lower surface of the frame 10 of the connector 5 of the assembly.

The retraction of the tool illustrated in FIG. 4 is then carried out.

After the raising of the tool, the lower branch 36 of the frame 34 is equipped with a bearing piece 51 of particular length, projecting towards the inside of the frame 34. The centring ring 47 is placed in a position ensuring centring during the rest of the unscrewing operation.

As a precaution, the recentring of the leaf springs 27 is carried out.

The tool is lowered into the region of the upper connector of the assembly and is placed in its position shown in FIG. 4.

The piece 51 is brought to bear on the end of the screw 16 by means of its concave surface 52, and the extraction screw 40 is clamped against the breaking surface of the screw 16.

The unscrewing of the part 16a of the screw 16 is then carried out, as before, the bearing piece 51 ensuring the centring of the apparatus within that part of the internally threaded hole passing through the frame 10 of the connector released by the threaded part 16a of the screw 16.

The operation is interrupted when the lower branch 36 of the frame 34 comes in contact with the lower surface of the frame 10 of the connector.

The entire tool is then raised to the platform of the pool in order to carry out a new adjustment.

The centring ring 47 is removed and a new bearing piece 51 is fastened to the lower branch 36 of the frame 34. This new bearing piece has a length greater than the length of the bearing piece used during the preceding phase. This length is substantially less than the thickness of the frame 10, so that, at the end of the unscrewing operation, the threaded body 16a of the screw 16 remains in engagement with the internally threaded hole of the frame 10.

In an embodiment put into practice by the applicant company, this bearing piece had a length of 18 mm.

The tool is lowered into the pool and put in place, as shown in FIG. 4, the centring of the tool being obtained by means of the bearing piece 51 introduced into that part of the internally threaded hole released by the threaded part 16a of the screw 16. Unscrewing is carried out in the way described above.

At the end of this last unscrewing phase using the apparatus according to the invention, the threaded part 16a of the screw 16 is unscrewed so that its upper end projects relative to the upper surface of the flange 8.

A conventional tool consisting of tongs mounted on the end of the pole 32 is then used to carry out the unscrewing of the last threads of that part 16a of the screw still in engagement with the threads of the internally threaded hole of the frame 10 and to deposit the part 16a of the screw in a recovery and discharge container arranged near the assembly.

The internally threaded hole of the frame 10 of the upper connector of the assembly has not undergone any damage, and it is thus possible, by means of a known process, to carry out the installation and screwing of a new retaining screw for the springs 27.

It should be noted that the form of the punch 50 of the extraction screw 40 makes it possible to exert the tightening force in the axis of the part 16a of the screw to be extracted. During the tightening of the extraction screw, a low torque is thus generated and causes no rotational movement of the threaded part 16a of the screw 16 to be extracted, in the screwing direction. In contrast, the bearing piece 51 has a concave end making it possible to obtain contact with the part 16a of the screw in a zone distant from the axis of the threaded part 16a. A high torque is thus produced on the bearing surface, making it possible to brake the part 16a of the screw during unscrewing.

Thus, in all cases, the apparatus according to the invention makes it possible to carry out simply, without damaging the internally threaded hole of the upper connector of the assembly, the removal of a fastening screw of which the head has been separated from the threaded body by breakage.

It is clear that the invention is not limited to the embodiment described.

Thus, the removal of the screw to be extracted can be carried out more quickly in a procedure involving only two phases, according to the length of the threaded part of the screw.

The apparatus according to the invention can be equipped with centring rings having any number of adjustment positions and with bearing pieces of different lengths.

It is likewise possible, where a prior removal of the flange of the assembly is carried out or in the removal of screws remaining projecting relative to the upper surface of the flange or of the connector, to employ apparatuses, such as those illustrated in FIGS. 5 and 6.

The apparatus according to the invention can also be adapted for the unscrewing and extraction of screws in the horizontal or inclined position. In this case, the method of fastening or connecting the frame to the elongate support must make it possible to obtain the desired inclination. Likewise, the means for the remote actuation of the screw possesses means for desired adaptation and inclination in order to reach the engagement profile of the head of the extraction screw.

The apparatus according to the invention for the unscrewing and extraction of screws having experienced a break can be used not only for screws retaining the springs of the upper connectors of the fuel assemblies of water-cooled reactors, but also for fastening screws of other elements of a fuel assembly of a nuclear reactor.

I claimed:

1. Apparatus for the remote unscrewing and extraction of a fastening screw of an element of a fuel assembly (1) of a nuclear reactor, the head of which is damaged, the screw being engaged by means of its head part (16b) in a bore (18) of a first piece (8) of the assembly (1) and by means of its threaded body (16a) in an internally threaded bore passing through a second piece (10), this apparatus comprising a C-shaped frame (34) having two branches (35, 36) substantially parallel to one another and a joining part (37) between the two branches (35) and (36), an extraction screw (40, 40', 40'') engaged in an internally threaded hole passing through one branch of the frame (34) and having one end (50) forming a punch directed towards the inside of the frame (34), and a bearing and centring piece (51), the diameter of which is smaller than the diameter of the internally threaded bore of the second piece (10) and which is fastened to the second branch (36) of the frame (34) and is directed towards the inside of the frame in the axial direction of the extraction screw (40, 40', 40''), characterized in that it also possesses:

a pole (32) to the end of which the C-shaped frame (34) is fastened, a ring (47) for centring the extraction screw (40) relative to the screw to be extracted (16), arranged round the extraction screw (40) over a smooth part (45) of this screw located between its threaded part and its end part (50) forming the punch, and a means (43) for the remote actuation of the extraction screw (40, 40', 40'') by screwing or unscrewing.

2. Apparatus according to claim 1, characterized in that the centring ring (47) has a diameter corresponding to the diameter of the bore (18), the centring of the extraction screw (40) relative to the screw to be extracted (16) being obtained by means of the bore (18).

3. Apparatus according to claim 2, characterized in that the centring ring (45) is fastened to the extraction screw (40) adjustably in the axial direction.

4. Apparatus according to claim 1, characterized in that the centring ring (55, 62) has an inside diameter slightly larger than the diameter of the screw (16) to be extracted in its damage part, and in that a spring pushing axially towards the end (50', 50'') of the screw (40', 40'') is fastened to the screw and bears on the ring (55, 62).

5. Apparatus according to claim 4, characterized in that the smooth part (60) of the screw, round which the centring ring (62) is fastened, has a diameter larger than the running diameter of the screw (40'') and possesses a bearing shoulder (61), on which a corresponding shoulder (63) of the centring and positioning ring (62) comes to rest.

6. Apparatus according to claim 1, characterized in that the extraction screw (40, 40', 40''), at its end opposite the punch (50), has an engagement profile (41) for the remote engagement of a screwdriver and a widened insertion part (42) for the guidance of the screwdriver in the direction of the profile (41).

7. Apparatus according to claim 1, characterized in that the screw (16) to be extracted is a fastening screw for springs (7, 27) retaining a fuel assembly (1) of a pressurized-water nuclear reactor, the first piece consisting of a flange (8), under which one end of the springs (7, 27) is engaged, and the second piece (10) consisting of a frame of the upper connector (5) of the fuel assembly (1), and in that the frame (34) is fastened to the end of the pole in such a way that its joining part (37) is in the extension of the pole (32), making it possible to carry out the unscrewing of the fastening screw (16) from the upper platform of a fuel-assembly deactivation pool.

8. Apparatus according to claim 1, for when the screw to be extracted is in a horizontal or inclined position, characterized in that the frame (34) is connected to the pole (32) in a corresponding position, and in that the means for the remote actuation of the extraction screw possesses means for adaptation and inclination in order to reach the engagement profile of the extraction screw (40).

* * * * *